United States Patent
Coatney et al.

(10) Patent No.: US 7,159,080 B1
(45) Date of Patent: Jan. 2, 2007

(54) SYSTEM AND METHOD FOR STORING STORAGE OPERATING SYSTEM DATA IN SWITCH PORTS

(75) Inventors: Susan M. Coatney, Cupertino, CA (US); Radek Aster, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 529 days.

(21) Appl. No.: 10/027,330

(22) Filed: Dec. 20, 2001

(51) Int. Cl.
*G06F 12/00* (2006.01)
*G06F 15/167* (2006.01)

(52) U.S. Cl. .................. 711/147; 711/114; 711/154; 709/214

(58) Field of Classification Search ................ 709/200, 709/212, 213, 214; 711/100, 147, 148, 154, 711/114
See application file for complete search history.

(56) References Cited

U.S. PATENT DOCUMENTS

| | | | |
|---|---|---|---|
| 5,157,667 A * | 10/1992 | Carusone et al. ............ 714/45 |
| 5,163,131 A | 11/1992 | Row et al. |
| 5,355,453 A | 10/1994 | Row et al. |
| 5,485,579 A | 1/1996 | Hitz et al. |
| 5,802,366 A | 9/1998 | Row et al. |
| 5,819,292 A | 10/1998 | Hitz et al. |
| 5,931,918 A | 8/1999 | Row et al. |
| 5,941,972 A | 8/1999 | Hoese et al. |
| 5,963,962 A | 10/1999 | Hitz et al. |
| 6,038,570 A | 3/2000 | Hitz et al. |
| 6,065,037 A | 5/2000 | Hitz et al. |
| 6,148,414 A * | 11/2000 | Brown et al. .................. 714/9 |
| 6,233,242 B1* | 5/2001 | Mayer et al. ................ 370/412 |
| 6,374,300 B1* | 4/2002 | Masters ....................... 709/229 |
| 6,425,035 B1 | 7/2002 | Hoese et al. |
| 6,697,924 B1* | 2/2004 | Swank ......................... 711/163 |
| 6,718,361 B1* | 4/2004 | Basani et al. ................ 709/201 |
| 6,748,447 B1* | 6/2004 | Basani et al. ................ 709/244 |
| 6,883,065 B1* | 4/2005 | Pittelkow et al. ............ 711/114 |
| 2002/0078299 A1* | 6/2002 | Chiou et al. ................. 711/119 |
| 2002/0083118 A1* | 6/2002 | Sim ............................. 709/105 |
| 2003/0005119 A1* | 1/2003 | Mercier et al. ............. 709/225 |
| 2003/0033389 A1* | 2/2003 | Simpson ...................... 709/220 |
| 2003/0212863 A1* | 11/2003 | Ganguly et al. ............. 711/118 |

OTHER PUBLICATIONS

American National Standards Institute, Inc.; American National Standard for Information Technology; Fibre Channel- Physical and Signaling Interface (FC-PH); Nov. 14, 1994.
American National Standards Institiute, Inc.; American National Standard for Information Technology—Fibre Channel Arbitrated Loop (FC-AL-2); Dec. 8, 1999.
SNIA Storage Networking Industry Association; Common Internet FIle System (CIFS), Version: CIPS-Spec. 0.9. Work Group in Progress.
Fibre Channel Generic Services—3 (FC-GS-3), Revision 6.0; NCITS Working Draft Proposed American National Standard for Information Technology; Nov. 24, 1999.
Draft Proposed American National Standard for Information Systems—SCSI-3 Primary Commands; Mar. 28, 1997.
New Identifier Formats Based on IEEE Registration; http://standards.ieee.org/regauth/oui/tutorials/fibreformat.html; Accessed on Aug. 6, 2001.

* cited by examiner

*Primary Examiner*—Tuan V. Thai
(74) *Attorney, Agent, or Firm*—Cesari and McKenna, LLP (57) ABSTRACT

A system and method of storing data for use by storage operating systems in memories associated with switch ports. The data is written to a switch port memory, which is readable by all devices connected to the switch, and by all devices connected to a switching fabric containing that switch. When a device connected to the switching fabric requires the information, the device retrieves the stored information from the switch-port memory, without the need for any interaction of the device that originally wrote the data.

27 Claims, 5 Drawing Sheets

SYSTEM AND METHOD FOR STORING STORAGE OPERATING SYSTEM DATA IN SWITCH PORTS

RELATED APPLICATIONS

This application is related to the following United States patent applications:

Ser. No. 10/027,020 filed on Dec. 21, 2001 entitled SYSTEM AND METHOD FOR TRANSFERRING VOLUME OWNERSHIP IN NETWORKED STORAGE, by Joydeep Sen Sarma et al.

Ser. No. 10/027,457 filed on Dec. 21, 2001 entitled SYSTEM AND METHOD OF IMPLEMENTING DISK OWNERSHIP IN NETWORKED STORAGE, by Susan M. Coatney et al.

Ser. No. 10/027,013 filed on Dec. 21, 2001 entitled SYSTEM AND METHOD FOR ALLOCATING SPARE DISKS IN NETWORKED STORAGE, by Alan L. Rowe et al.

FIELD OF THE INVENTION

This invention relates to network storage systems, and more particularly to data storage systems including file servers for managing a number of attached storage volumes.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, conversely, may be implemented as a specially formatted file in which information by other files and directories is stored.

A filer may be further configured to operate according to a client/server model of information delivery to thereby allow many clients to access files stored on a server. In this model, the client may comprise an application, such as a database application, executing on a computer that connects to the filer over a computer network. This computer network could be a point to point link, a shared local area network (LAN), a wide area network (WAN) or a virtual private network (VPN) implemented over a public network such as the Internet. Each client may request the services of the file system on the filer by issuing file system protocol messages (typically in the form of packets) to the filer over the network.

The disk storage typically implemented has one or more storage "volumes" comprised of a collection of physical storage disks, defining an overall logical arrangement of storage space. Currently available filer implementations can serve a large number of discrete volumes (150 or more, for example). Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group, and the appropriate caching of parity information with respect to the striped data. In the example of a WAFL-based file system and process, a RAID 4 implementation is advantageously employed. This implementation specifically entails the striping of data across a group of disks, and separate parity caching within a selected disk of the RAID 4 group.

The physical disks are often connected to a switching network. This switching network may take the form of Fibre Channel switches connected to fibre channel loops, with each loop having a number of disks connected thereto. By utilizing a number of interconnected switches, a switching fabric can be created. This fabric allows any individual filer to have access to, subject to ownership limitations, any disk connected to the switching fabric; however, only the filer that "owns" a disk can write to that disk. One methodology of ownership of disks within a network storage environment, such as a switching fabric, is described in U.S. patent application Ser. No. 10/027,020 filed on Dec. 21, 2001 entitled SYSTEM AND METHOD FOR TRANSFERRING VOLUME OWNERSHIP IN NETWORKED STORAGE by Joydeep sen Sarma et al, which is hereby incorporated by reference. Another methodology is described in U.S. patent application Ser. No. 10/027,457 filed on Dec. 21, 2001 entitled SYSTEM AND METHOD OF IMPLEMENTING DISK OWNERSHIP IN NETWORKED STORAGE, by Susan M. Coatney et al.

As part of an ownership system, each filer "knows" which disks it owns. In other words, each filer has a list of identifiers for owned disks. Additionally, each disk preferably has ownership information written to a predetermined area of the disk, defined as "sector S" in the aforementioned patent application. This disk ownership information may be a unique serial number for the owning filer. However, the need can arise when other filers require, in place of the filer serial number, a resolvable address name, i.e. a name that can be resolved into a network address using an appropriate technology such as is the Domain Naming Service (DNS). To distribute these resolvable names, filers currently broadcast the address information in a data packet to all devices connected to the switching fabric.

Additionally, it is often required to take individual disks offline for a period of time. For example, the disks may be receiving a firmware upgrade. If a file server attempts to access an inaccessible offline disk, data loss can occur. It is, thus, preferable that each filer connected to a switching fabric be able to determine which disks are offline and inaccessible, thereby avoiding data loss. A current method to distribute this information employs the sending of a multicast data packet to all of the filers on a switching fabric containing a list of disks that are offline and inaccessible.

A noted disadvantage of the multicast method of distributing these types of data is a need to ensure that all filers receive any updated information. For example, if a filer is offline when a packet is broadcast, the filer will not receive the data. If the filer subsequently comes on-line, and attempts to access an offline and inaccessible disk, the data may be lost. Similarly, if a filer is offline when a resolvable name is broadcast, but then comes on-line, that filer will not know the address resolvable name. File servers can be programmed to regularly re-broadcast this data, but a filer still needs to wait until the next broadcast to receive this information.

Thus, it is an object of the invention to provide a system and method for storing and distributing various data for use by the devices connected to a switching fabric without the need for multicasting data packets.

SUMMARY OF THE INVENTION

This invention overcomes the disadvantages of the prior art by providing a system and method for storing and distributing data required by a storage operating system to all devices attached to a switching fabric without need to broadcast the data throughout the overall storage system. Specifically, the data is written to the memory associated with a specific port on a predetermined switch in the switching fabric. A file server's address resolvable name is written to the memory associated with the switch port that the file server is physically connected to. When a disk is taken offline and made inaccessible, a form of disk identification and state (i.e., accessible or not) is written to the switch port connected to the disk's fibre channel loop.

More specifically, upon initialization a file server writes its identification and address resolvable name to the switch port memory of the port to which the filer is connected. Other filers on the switching fabric are capable of reading this information from the switch port memory. If a filer goes offline, or otherwise becomes unresponsive, the filer's identification and address is still accessible by other devices on the switching fabric.

When a disk is taken offline and cannot be accessed due to a firmware upgrade (or for other reasons), an identifying string is written to the switch port memory of the port to which the loop containing the disk is connected. When the status of a disk is changed, the switch generates a fabric event in accordance with the Fibre Channel specification. This fabric event notification will cause file servers connected to the switching fabric to re-read the associated switch port memory to obtain the updated information. This check of the port memory ensures that access requests are not passed to an inaccessible offline disk, thereby causing data loss.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 1 is a schematic block diagram of a network environment including file servers, servers, clients and the like;

DETAILED DESCRIPTION OF ILLUSTRATIVE EMBODIMENTS

A. Network Environment

Figure 1:
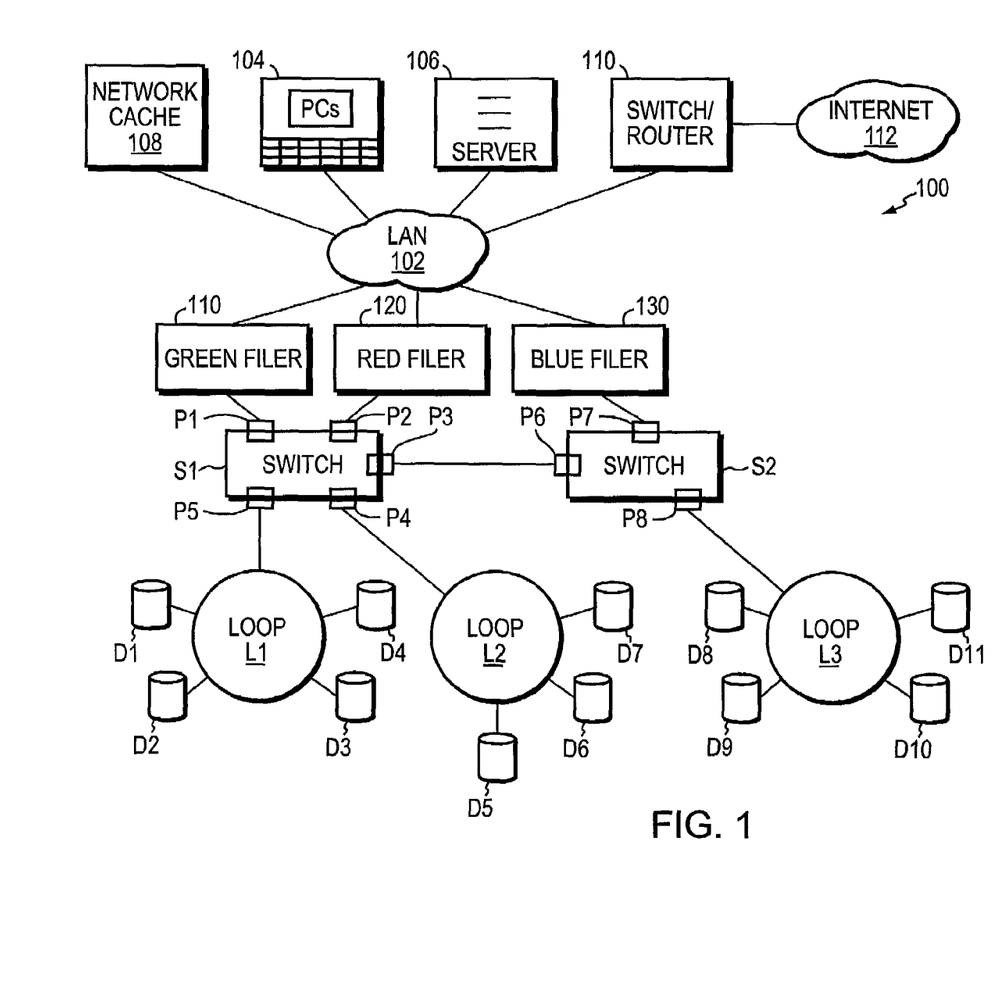

FIG. 1 is a schematic block diagram of an exemplary network environment 100 in which the principles of the present invention are implemented. The network 100 is based around a local area network (LAN) 102 interconnection. However, a wide area network (WAN), virtual private network (VPN) (utilizing communication links over the Internet, for example), or a combination of LAN, WAN and VPN implementations can be established. For the purposes of this description the term LAN should be taken broadly to include any acceptable networking architecture. The LAN interconnects various clients based upon personal computers 104, servers 106 and a network cache 108. Also interconnected to the LAN may be a switch/router 110 that provides a gateway to the well-known Internet 112 thereby enabling various network devices to transmit and receive Internet based information, including e-mail, web content, and the like.

Exemplary file servers, including an arbitrarily designated "green" filer 110, a "red" filer 120 and a "blue" filer 130, are connected to the LAN 102. These file servers, described further below, are configured to control storage of, and access to, data in a set of interconnected storage volumes. As described further below, each file server is typically organized to include one or more RAID groups of physical storage disks for increased data storage integrity and reliability. Each of the devices attached to the LAN include an appropriate conventional network interface arrangement (not shown) for communicating over the LAN using desired communication protocols such as the well-known Transport Control Protocol/Internet Protocol (TCP/IP), User Datagram Protocol (UDP), Hypertext Transfer Protocol (HTTP), or Simple Network Management Protocol (SNMP).

The file servers are also connected to exemplary switches S1 and S2. The switches S1 and S2 are preferably Fibre Channel switches, but it is expressly contemplated that other types of switches may be utilized in accordance with the invention. An exemplary switch that can be used in accordance with this invention is the Silkworm 6400™ from Brocade of San Jose, Calif.

In this illustrative embodiment, switch S1 has a plurality of ports P1, P2, P3, P4 and P5. The green filer 110 and red filer 120 are connected to ports P1 and P2 respectfully. Port P3 is connected to port P6 located on switch S2. This inter-switch connection enables the switches to produce a switching fabric. The switching fabric can be expanded with any number of switches and topological configurations. A device connected to one port of a switch within the switching fabric can access any other device (subject to ownership limitations) also connected to the switching fabric.

Connected to ports P4 and P5 are fibre channel loops L1 and L2. Each loop has a plurality of disks attached. In this illustrative embodiment, loop L1 has disks D1, D2, D3 and D4 attached. By the use of a disk ownership system, any disk connected to the switching fabric can be "seen" by any file server. By being "seen," it is meant that the filer can read data from the disk, and if the filer owns the disk, can write data to the disk. One exemplary disk ownership system is described in the patent application previously incorporated.

B. File Servers

Figure 2:
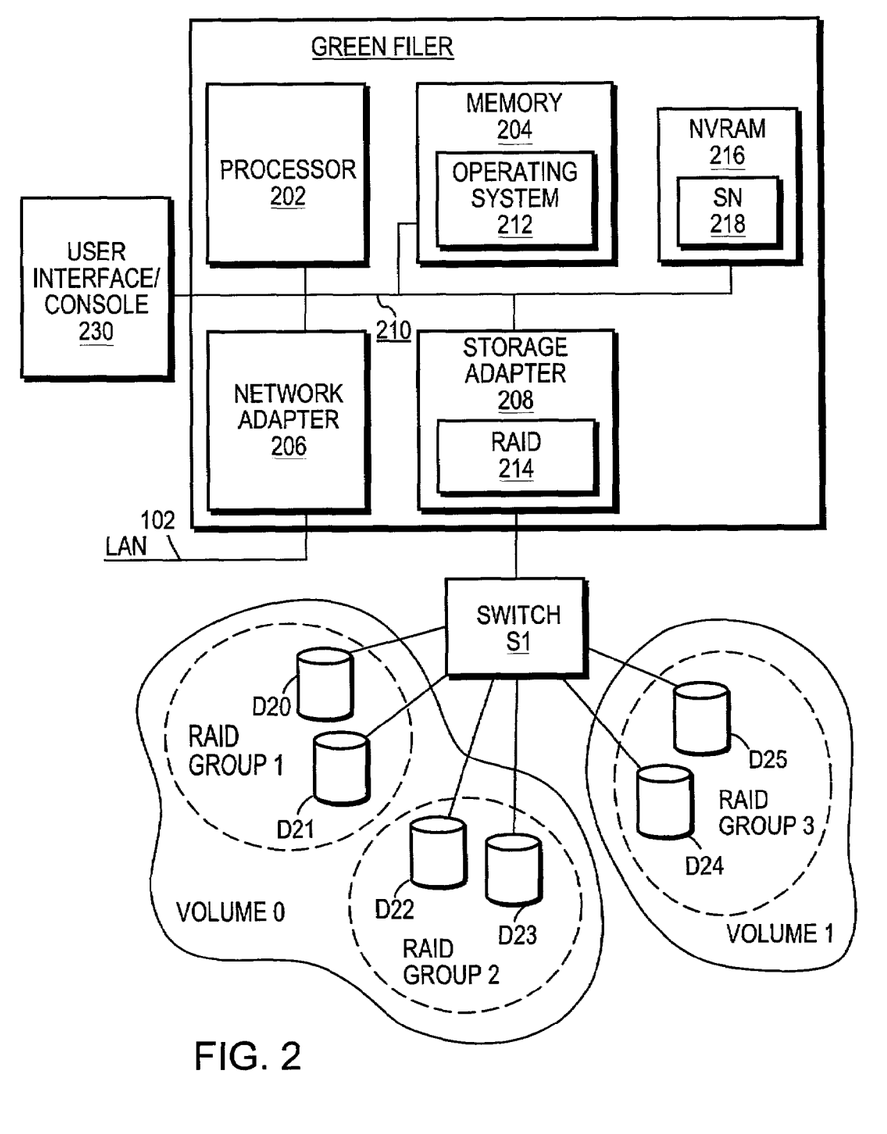
FIG. 2 is a more-detailed schematic diagram of an exemplary file server from FIG. 1.

FIG. 2 is a more-detailed schematic block diagram of the exemplary file server 110, implemented as a network storage appliance, such as a NetApp® filer available from Network Appliance, that is advantageously used with the present invention. Other filers can have similar construction (including filers 120 and 130). By way of background, a file server, embodied by a filer, is a computer that provides file service relating to the organization of information on storage devices, such as disks. It will be understood by those skilled in the art that the inventive concepts described herein may apply to any type of filer, whether implemented as a special-purpose or general-purpose computer, including a stand alone computer. The filer comprises a processor 202, a memory 204, a network adapter 206, a storage adapter 208 and a non-volatile RAM (NVRAM) 216 interconnected by a system bus 210. Notably, the NVRAM is used in part in this example to store file service requests for replay in the event of a system interruption. However, as described further, the NVRAM may store other forms of data in a reliable manner. The filer also includes a storage operating system 212 that implements a file system to logically organize the information as a hierarchical structure of directories and files on the disks. The filer also includes a user interface/console 230 used generally for inputting commands and reporting status of the filer and storage operating system.

In the illustrative embodiment, the memory 204 may have storage locations that are addressable by the processor and adapters for storing software program code or data structures associated with the present invention. The processor and adapters may, in turn, comprise processing elements and/or logic circuitry configured to execute the software code and manipulate the data structures. The storage operating system 212, portions of which are typically resident in memory and executed by the processing elements, functionally organize a file server by inter-alia invoking storage operations in support of a file service implemented by the file server. It will be apparent to those skilled in the art that other processing and memory implementations, including various computer-readable media, may be used for storing and executing program instructions pertaining to the inventive technique described herein.

As noted, the NVRAM 216 is used for various filer backup functions according to this embodiment. In addition, within the NVRAM is contained a unique serial number (SN) 218. This serial number 218 is preferably generated during the manufacturing of the file server; however, it is contemplated that other forms of generating the serial number may be used, including, but not limited to, using a general purpose computer's microprocessor identification number, the file server's media access code (MAC) address, etc.

The network adapter 206 comprises the mechanical, electrical and signaling circuitry needed to connect the file server to a client over the computer network, which as described generally above can comprise a point-to-point connection or a shared medium such as a local area network. A client can be a general-purpose computer configured to execute applications including file system protocols, such as the Common Internet File System (CIFS) protocol. Moreover, the client can interact with the file server in accordance with the client/server model of information delivery. The storage adapter cooperates with the storage operating system 212 executing in the file server to access information requested by the client. The information may be stored in a number of storage volumes (Volume 0 and Volume 1), each constructed from an array of physical disks that are organized as RAID groups (RAID GROUPs 1, 2 and 3). The RAID groups include independent physical disks including those storing a striped data and those storing separate parity data (RAID 4). In accordance with a preferred embodiment RAID 4 is used. However, other configurations (e.g., RAID 5) are also contemplated.

The storage adapter 208 includes input/output interface circuitry that couples to the disks over an input/output (I/O) interconnect arrangement such as a conventional high-speed/high-performance fibre channel serial link topology. The storage adapter retrieves the information, and if necessary, processed by the processor (or the adapter itself) prior to being forwarded over the system bus to the network adapter, where the information is formatted into a packet and returned to the client.

To facilitate access to the disks, the storage operating system implements a file system that logically organizes the information as a hierarchical structure of directories in files on the disks. Each on-disk file may be implemented as a set of disk blocks configured to store information such as text, whereas the directory may be implemented as a specially formatted file in which other files and directories are stored. In the illustrative embodiment described herein, the storage operating system associated with each volume is preferably the NetApp® Data ONTAP operating system available from Network Appliance, Inc. of Sunnyvale, Calif. that implements a Write Anywhere File Layout (WAFL) file system. The preferred storage operating system for the exemplary file server is now described briefly. However, it is expressly contemplated that the principles of this invention can be implemented using a variety of alternate storage operating system architectures.

C. Storage Operating System

Figure 3:
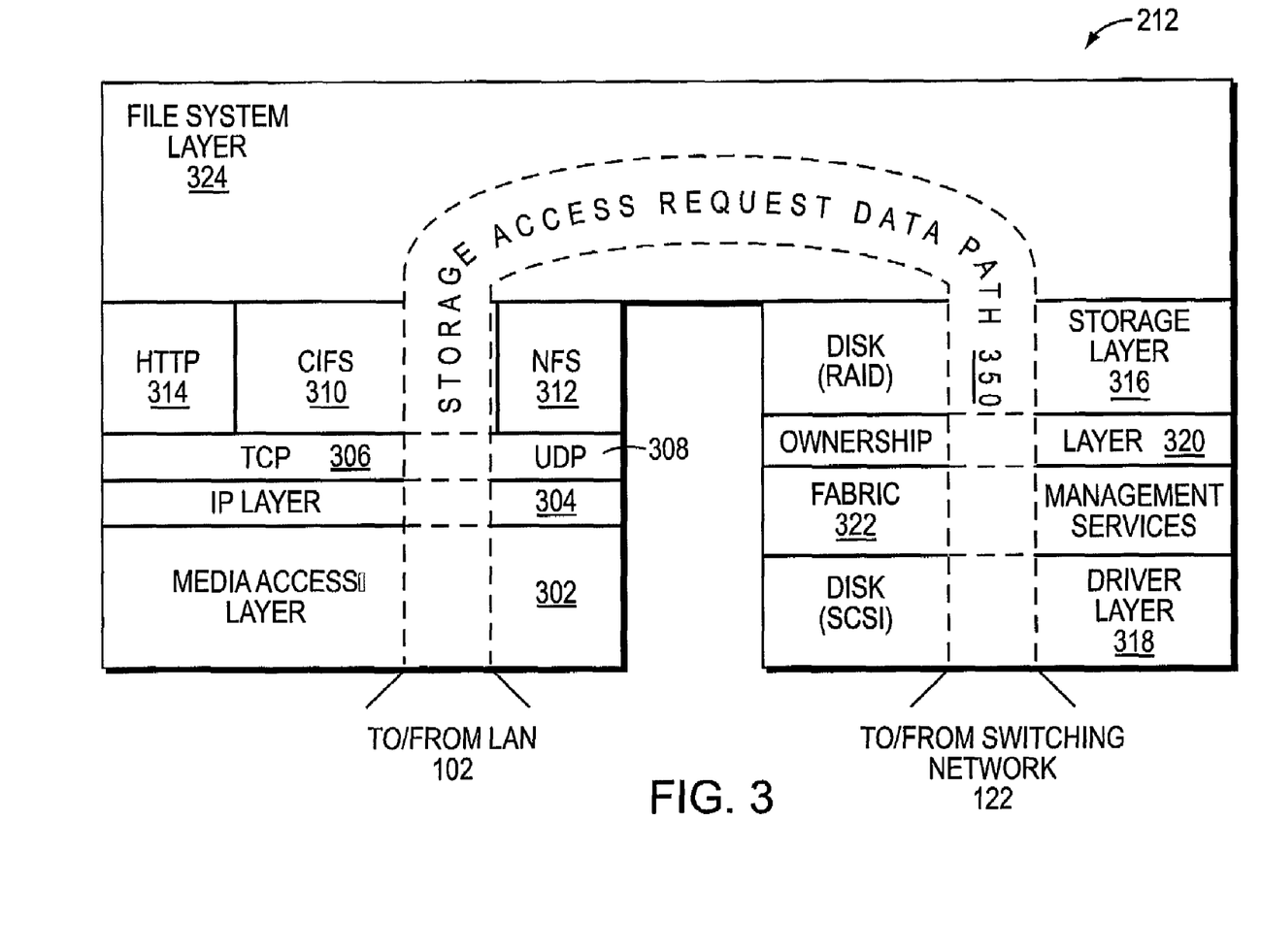
FIG. 3 is a schematic block diagram of a storage operating system that is advantageously used with the file server of FIG. 2 in an embodiment of this invention.

As shown in FIG. 3, the storage operating system 212 comprises a series of software layers including a media access layer 302 of network drivers (e.g., an Ethernet driver). The storage operating system further includes network protocol layers such as the IP layer 304 and its TCP layer 306 and a UDP layer 308. A file system protocol layer provides multi-protocol data access and, to that end, includes support from the CIFS protocol 310, the Network File System (NFS) protocol 312 and the HTTP protocol 314.

In addition, the storage operating system 212 includes a disk storage layer 316 that implements a disk storage protocol such as a RAID protocol, and a disk driver layer 318 that implements a disk access protocol such as e.g., a Small Computer System Interface (SCSI) protocol.

As used herein, the term "storage operating system" generally refers to the computer-executable code operable on a storage system that implements file system semantics (such as the above-referenced WAFL) and manages data access. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Bridging the disk software layers with the network and file system protocol layers is a file system layer 324 of the storage operating system. Generally, the file system layer 324 implements a file system having an on-disk file format representation that is a block based. The file system generated operations to load/retrieve the requested data of volumes if it not resident "in-core," i.e., in the file server's memory. If the information is not in memory, the file system layer indexes into the inode file using the inode number to access an appropriate entry and retrieve a logical block number. The file system layer then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the file server. Upon completion of the request, the file server and storage operating system return a reply, e.g., a conventional acknowledgement packet defined by the CIFS specification, to the client over the network. It should be noted that the software "path" 350 through the storage operating system layers described above needed to perform data storage access for the client received the file server may ultimately be implemented in hardware, software or a combination of hardware and software (firmware, for example).

The storage operating system also contains a fabric management services layer 322, which performs various functions related to the switching fabric connected to the filer. Specifically, the fabric management layer contains routines for reading from and writing to the switch port memories in any switch in the fabric. This reading/writing is described in *FIBRE CHANNEL Generic Services—3 Rev. 6.0* by Committee T11, Nov. 24, 1999, which is hereby incorporated by reference.

The fabric management layer utilizes the Name Server of the Directory Service described in the FIBRE CHANNEL Generic Services document incorporated above to store and retrieve the data in the switch port memory. In this example, each port has associated with it a Symbolic Port Name field of 256 bytes. By utilizing the Common Transport (CT) protocol defined within the Fibre Channel specification, a filer connected to a switching fabric can read and write data to this area of memory. In one embodiment, the term "switch port memory" should be taken to mean the Symbolic Port Name data structure. It is expressly contemplated that other forms of switch port memories may be utilized according to the teachings of this invention.

To write data to the switch port memory, the exemplary fabric management layer issues a RSPN_ID (Register Symbolic Port Name) command, defined in the Fibre Channel Specification incorporated above, to the appropriate switch with a port identifier and a 256-byte block of data to be stored in the Symbolic Port Name field. The switch, upon receiving the command, stores the data block in the memory reserved for the Symbolic Port Name. Similarly, to read data a GSPN_ID (Get Symbolic Port name) command is issued with the appropriate port identifier as a variable. The appropriate switch reads the memory and returns the data to the requesting filer.

In one embodiment, the fabric management layer, during initialization of the filer, writes the filer's unique serial number stored in NVRAM and the filer's resolvable address to the switch port memory of the port that the filer is connected to. Other devices within the switching fabric can then utilize this serial number and address information. In one exemplary embodiment, the ownership information written to disks consists of the serial number of the owning filer. This ownership methodology is described in commonly owned U.S. patent application Ser. No. 10/027,457 filed on Dec. 21, 2001 entitled SYSTEM AND METHOD OF IMPLEMENTING DISK OWNERSHIP IN NETWORK STORAGE, by Susan M. Coatney et al., which is hereby incorporated by reference. By writing this data to the switch port memory, each device on the switching fabric can obtain both the serial number and the filer's resolvable address.

In another embodiment, if a disk that a filer "owns" is being updated with new firmware, or is otherwise offline, the filer writes identifying information to the switch port to which the disk is connected. This identifying information can, in one embodiment, consist of the disk's world wide name. The world wide name is a 64-bit identification number, which is unique for every item, attached to a fibre channel network. World wide names are described in *ANSI X3.230-1995, Fibre Channel Physical and Signaling Interface* (FC-PH) and Bob Snively, *New Identifier Formats Based on IEEE Registration X3T11/96-467*, revision 2, which are hereby incorporated by reference. The world wide name is generally inserted into disk drives during their manufacturing process.

In another embodiment, the identifying information consists of a disk identification. One acceptable expression of this disk identification is:

switch_name:port_number.disk

Figure 4:
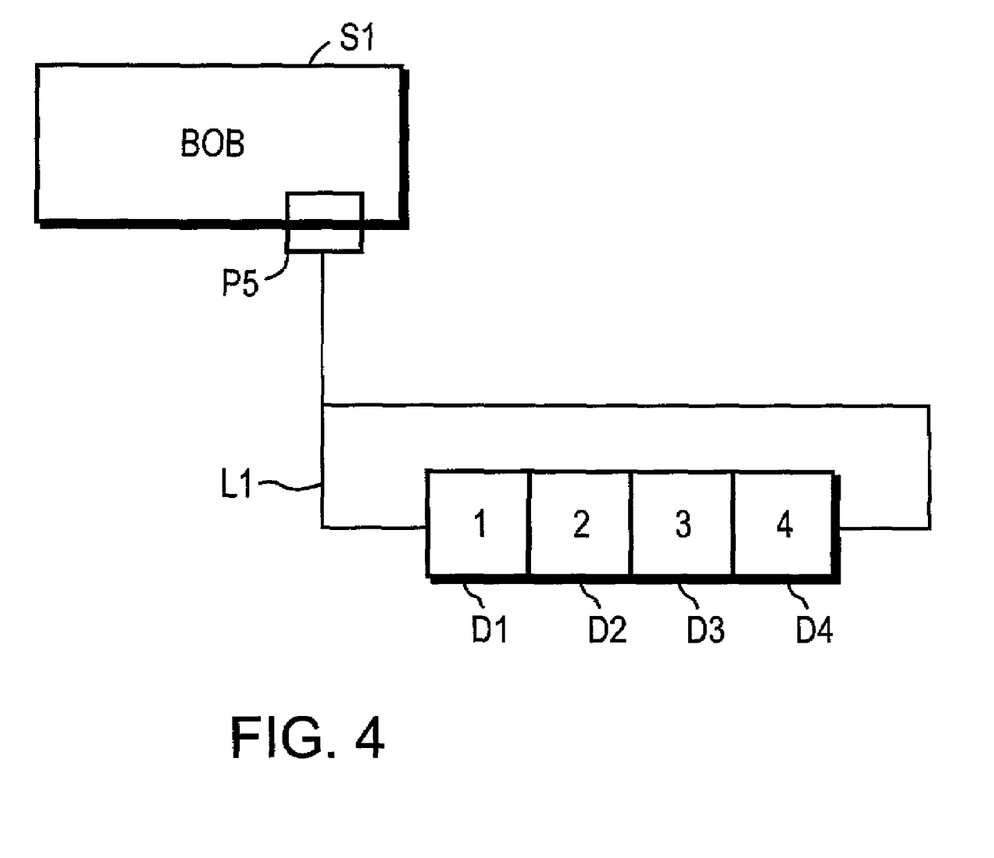
FIG. 4 is a more-detailed schematic block diagram of one of the switches and associated fibre channel loops of FIG. 1.

The switch_name is the full name of the switch that is connected to the loop having the disk. The port_number is the number of the port on the switch. The exemplary switches commonly have 16 ports numbered 0–15, although switches having any number of ports can be used in accordance with the teachings of this invention. The disk value is the number of the disk on the loop emanating from the port. The components of this disk identification scheme are shown in FIG. 4, which is a more-detailed block diagram of switch S1 and loop L1 from FIG. 1. Switch S1 is shown as being arbitrarily named "Bob." By way of example, port P5 is connected to loop L1. Disks D1, D2, D3 and D4 are connected to loop L1. Thus, in this illustrative example, disk D3 would have as its disk identification: "Bob:5.3." If disk D3 was being taken offline and being made inaccessible, the fabric management services layer of its owning filer would write "Bob:5.3" to the switch memory associated with port P5.

During normal operation, the ownership layer of the storage operating system alerts the disk driver level if any disks are inaccessible and offline. The ownership layer receives this offline and inaccessible information from the fabric services management layer, which monitors the information stored in the switch port memories. If an access request for an inaccessible offline disk arrives at the ownership layer from the storage access request path 350, the ownership layer will send a message to the client requesting access. Once the disk is online, the owning filer updates the information in the switch port memory.

In an exemplary embodiment, the switches report any changes to the information stored in the switch port memory to all connected file servers. Each file server must determine the contents of the switch port memories at initialization and then when alerted to a change by the switch. Thus, file servers do not need to check the switch port memory before every input/output operation.

Figure 5:
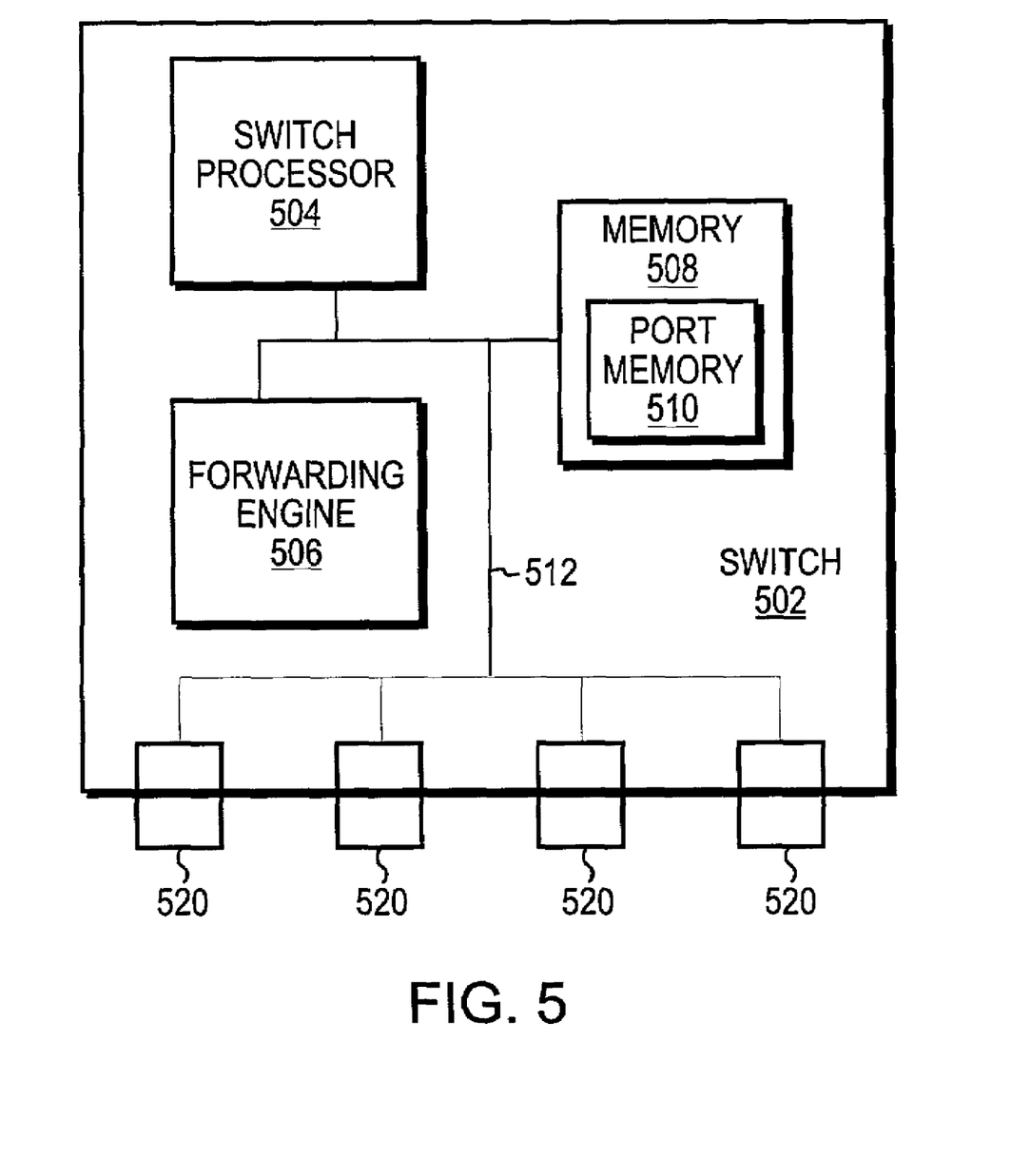
FIG. 5 a schematic block diagram of an exemplary switch that is advantageously used in accordance with the present invention

FIG. 5 is a schematic block diagram of an exemplary switch used in accordance with this invention. The switch 502 has a processor 504, a forwarding engine 506 and a memory 508 interconnected by a bus 512. Additionally a plurality of input/output (I/O) ports 520 are connected to the bus 512. In one embodiment, the memory contains a switch port memory 510, which is an area of memory associated with each port. In other embodiments, the switch port memory 510 can be integrated into the actual ports, or be a separate memory block on the bus. In one embodiment, the switch port memory is 256 bytes in storage size for each port.

The foregoing has been a detailed description of illustrative embodiments of the invention. Various modifications and additions can be made without departing from the spirit and scope of the invention. For example, other types of data can be stored in the switch port memories for use by devices within the network storage system. While a particular file system is described, it is expressly contemplated that any file system capable of managing disk storage through a switching fabric may be utilized. Further, the use of Data ONTAP and WAFL in the description herein is exemplary only, and other storage operating systems can implement the invention. Finally, it is expressly contemplated that any or all of the architecture, processes and data structures described above can be implemented in hardware, firmware or software comprising a computer-readable medium consisting of program instructions executing on a computer, or any combination of hardware, firmware and/or software. Accordingly, this description is meant to be taken only by way of example, and not to otherwise limit the scope of the invention.

What is claimed is:

1. A method for storing and distributing data in a network storage system having a plurality of devices interconnected with one or more switches, the method comprising:
   writing, by one of the plurality of devices, a set of data to a memory associated with a port of one of the one or more switches, the memory being readable by all of the plurality of devices;
   reading, by one of the plurality of devices, the set of data from the memory;
   including in the set of data identification of one or more disks that are offline and inaccessible to any of the plurality of devices; and
   including in the set of data a disk identification string, the disk identification string indicating a name of a switch, a port number on the switch, and a disk number.

2. The method of claim 1, wherein the set of data further comprises:
   a unique identification of one of the devices; and
   an address of the one of the devices.

3. The method of claim 1, wherein the unique identification of one of the devices further comprises a unique serial number of the device.

4. The method of claim 1, wherein the address of one of the devices further comprises a fully qualified network address.

5. The method of claim 1, wherein the memory associated with a port further comprises a Symbolic Port Name field.

6. The method of claim 1, further comprising:
   using as one of the plurality of devices a filer.

7. The method of claim 1, further comprising:
   using as one of the plurality of devices a disk.

8. A network storage system comprising:
   one or more switches having a plurality of ports, each switch having a memory associated with the port;
   a plurality of file servers interconnected with the one or more switches;
   a plurality of disks, each disk of the plurality of disks connected to at least one of the one or more switches; and
   a fabric management layer configured to include in the set of data identification of one or more disks that are offline and inaccessible to any of the plurality of devices and further configured to include in the set of data a disk identification string for each disk, the disk identification string indicating a name of a switch, a port number on the switch, and a disk number.

9. The network storage system of claim 8, wherein the set of data further comprises:
   a unique identification of one of the devices; and
   an address of the one of the devices.

10. The network storage system of claim 9, wherein the unique identification of one of the devices further comprises an unique serial number.

11. The network storage system of claim 9, wherein the address further comprises a fully qualified network address.

12. The network storage system of claim 8, wherein the plurality of switches comprise fibre channel switches operatively interconnected to define a switching fabric.

13. The network storage system of claim 8, wherein the memory associated with the port further comprises a Symbolic Port Name field.

14. The network storage system of claim 8, wherein one of the plurality of devices is a filer.

15. The network storage system of claim 8, wherein one of the plurality of devices a disk.

16. A computer-readable medium, including program instructions executing on a file server, for storing and distributing data in a network storage system, the program instructions performing comprising:
   writing, by one of a plurality of devices, a set of data to a memory associated with a port of a switch, the memory being readable by all of the plurality of devices;
   reading, by one of the plurality of devices, the set of data from the memory;
   including in the set of data identification of one or more disks that are offline and inaccessible to any of the plurality of devices; and
   including in the set of data a disk identification string for each disk, the disk identification string indicating a name of a switch, a port number on the switch, and a disk number.

17. A method for storing and distributing data in a network storage system having a plurality of devices interconnected with a switch, the method comprising:
   writing, by a first one of the plurality of devices, a set of data into a port memory associated with a port of the switch;
   including in the set of data a disk identification string, the disk identification string indicating a name of a switch, a port number on the switch, a disk number, and a status of the disk; and
   reading by a second one of the plurality of devices the set of data from the port memory to determine the status of the disk.

18. The method of claim 17, wherein the plurality of devices comprises:
   a plurality of filers.

19. The method of claim 18, further comprising:
   reading, by a second filer of the plurality of filers when a first filer goes offline and in response to the disk identification string written by the first filer, the disks accessed by the first filer.

20. The method of claim 19, further comprising:
   determining, by a filer of the plurality of filers, if a disk has gone offline.

21. The method of claim 17, further comprising:
   writing disk identification information into the port memory upon boot-up of a device of the plurality of devices, and the port memory accessible to being read by a processor in the switch.

22. An apparatus for storing and distributing data in a network storage system having a plurality of devices interconnected with a switch, the method comprising:
- means for writing, by a first one of the plurality of devices, a set of data into a port memory associated with a port of the switch;
- means for including in the set of data a disk identification string, the disk identification string indicating a name of a switch, a port number on the switch, a disk number, and a status of the disk; and
- means for reading by a second one of the plurality of devices the set of data from the port memory to determine the status of the disk.

23. The apparatus of claim 22, wherein the plurality of devices comprises:
- a plurality of filers.

24. The apparatus of claim 23, further comprising:
- means for reading, by a second filer of the plurality of filers when a first filer goes offline and in response to the disk identification string written by the first filer, the disks accessed by the first filer.

25. The apparatus of claim 23, further comprising:
- means for determining, by a filer of the plurality of filers, if a disk has gone offline.

26. The apparatus of claim 22, further comprising:
- means for writing disk identification information into the port memory upon boot-up of a device of the plurality of devices, and the port memory accessible to being read by a processor in the switch.

27. A computer readable media, comprising:
- said computer readable media containing instructions for execution on a processor for the practice of a method for operating a plurality of devices interconnected with a switch, comprising:
- writing, by a first one of the plurality of devices, a set of data into a port memory associated with a port of the switch; and
- including in the set of data a disk identification string, the disk identification string indicating a name of a switch, a port number on the switch, a disk number, and a status of the disk; and
- reading by a second one of the plurality of devices the set of data from the port 11 memory to determine the status of the disk.

* * * * *